Oct. 6, 1959 — E. F. MACKS — 2,907,594

SEAL

Filed March 4, 1957

INVENTOR.
ELMER FRED MACKS
BY Pyle & Fisher
ATTORNEYS

United States Patent Office 2,907,594
Patented Oct. 6, 1959

2,907,594

SEAL

Elmer Fred Macks, Vermilion, Ohio

Application March 4, 1957, Serial No. 643,665

12 Claims. (Cl. 286—9)

This invention relates to fluid seals and more particularly to new and novel improvements for inhibiting the escape of fluid from a fluid pressure chamber surrounding a rotating shaft.

In the copending application for patent bearing Serial No. 597,039 filed July 10, 1956 under the title "Seal," certain basic concepts pertaining to face type shaft seals have been disclosed. This case is a continuation-in-part of that application disclosing certain new and novel refinements. That application in turn is a continuation-in-part application of U.S. patent application Number 484,152, filed January 26, 1955, now abandoned, under the title "Seal," and that application in turn is a continuation-in-part of Serial Number 462,195, filed October 4, 1954 under the title, "Sealing Member."

Many relatively recently developed products require fluid seals which function under extreme conditions of temperature, speed, and pressure. Prior known seals have depended upon such things as rubber and plastic static seals and upon intimate rubbing surfaces. Materials thus employed for seals are subject to destruction by extreme temperature and speed conditions. In the improved seal disclosed in the above referenced copending application and this case, a seal is provided in which inorganic materials which are resistant to extremes of temperature and pressure may be used. A seal formed from such materials has been devised which utilizes small quantities of the fluid to be sealed to form a fluid film. This film serves to provide a fluid pressure seal between relatively moving parts under extremes of temperature, pressure, or other adverse ambient conditions.

Prior known seals which are intended to operate at relatively high temperature, pressures, or surface speeds have depended either on intimate rubbing of surfaces or large clearance seals. An example of a rubbing surface seal is the type known as carbon-face seals. These rubbing surface seals are subject to excessive wear. The controlled-gap, labyrinth type seal is an example of a type of large clearance seal. These large clearance seals have great leakage losses. The seal disclosed here operates on an inherently automatic feed back principle. The feed back prevents surfaces undergoing relative motion from contacting over the principal operating range. The surfaces are separated by a pressurized film of the fluid being sealed. The separation distance between the surfaces may be of the order of 0.0001 inch. No wear occurs, extremely minute leakage occurs, and the operating limits of speed, temperature and pressure are very greatly increased.

It has been discovered that greatly improved results, particularly in the life span and the operable speed and temperature ranges of a fluid seal, can be obtained through the provision of a cartridge unit having first and second surfaces between which a pressurized film of fluid is generated, and in which cartridge unit one of the surfaces is movable relative to the other and urged by a resilient body carried in an improved retainer unit.

Accordingly, one of the principal objects of the present invention is to provide a new and improved cartridge unit having first and second relatively movable surfaces, a retainer and a resilient member to urge one of the surfaces in such relative movement, and compensating fluid conduction means for transmission of fluid under pressure into a region between the relatively movable surfaces, such fluid transmission being self-adjusting according to the conditions of the fluid pressure to be sealed so as to maintain separation of the surfaces over the principal operating range.

Another object of this invention is to provide a unit made in accordance with the foregoing teaching in which one or more filters are provided to prevent the clogging of the compensating fluid conduction means.

Yet another object of this invention is to provide a new and improved cartridge bearing made in accordance with the foregoing teaching and having an impervious flexible sleeve interposed between the cartridge housing and the movable body to maintain fluid integrity.

Another object of this invention is to provide a cartridge seal which has a new and novel construction which requires fluid under pressure passing through it to traverse a tortuous path and thereby cause dirt and other impurities to drop out of suspension.

A further and more detailed object of this invention is to provide a new and novel fluid film producing body having a recess therein and a narrow portion defining substantially a curved line along the edge of such recess.

A still further more detailed object of the invention is to provide an improved fluid film producing body in which the fluid compensating and conducting means takes the form of a shallow groove formed in one of the load carrying fluid film producing body surfaces to provide a fluid conduction passage between the pressure chamber and the recess.

Other objects and a fuller understanding of the invention may be had by referring to the following specification and claims, taken in conjunction with the accompanying drawings, in which:

Figure 1:
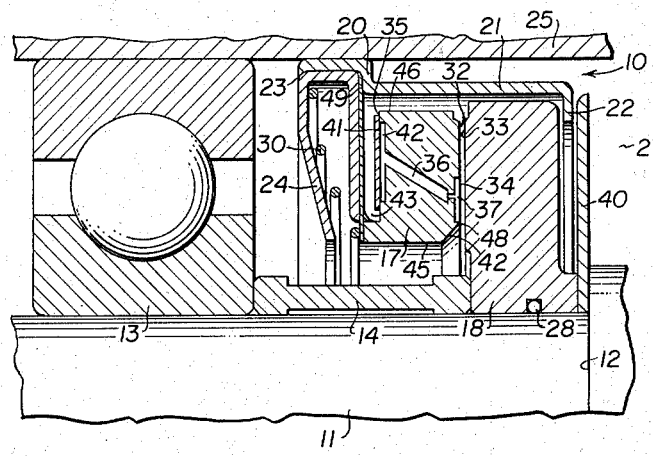
Figure 1 is a sectional view of one-half of an annular cartridge fluid seal made in accordance with the present teaching.
Figure 2:
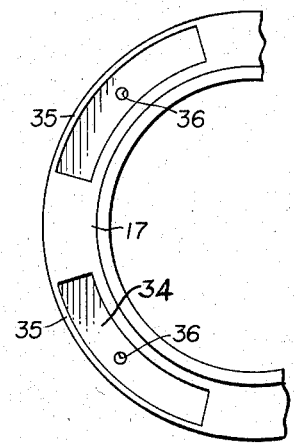
Figure 2 is a fragmentary front elevational view of the recessed surface of Figure 1.

Referring to the drawings and to Figures 1 and 2 in particular, a cartridge is shown generally at 10. The cartridge 10 is mounted on the shaft 11 and abuts against a shoulder 12 on the shaft. The shaft is at least partially carried by a ball bearing 13 which absorbs radial load.

As will be apparent from examination of the representation of the ball bearing 13, the drawings are made on an enlarged scale to make certain refinements and details clear. Many of the dimensions have, for clarity of illustration, been greatly magnified in the drawings. These dimensions will subsequently be described in more detail and it should be borne in mind that because of the nature of the tolerances and dimensions, the figures cannot be shown as dimensionally correct in every detail.

A spacer 14 may be carried by the shaft 11. The spacer 14 abuts against the ball bearing 13. The cartridge 10 includes first and second relatively movable bodies 17, 18. The spacer 14, in the embodiment of Figure 1, abuts against the body 18. A housing 21 is provided. The housing has an inwardly directed lip 22 which overlaps the body 18. The housing has, at its other axial end, a rolled end portion 23. The housing 21 also has a shoulder 20. The housing 21 grips a spring retainer 24 between the shoulder 20 and the rolled end portion 23. The housing 21 may, for example, be formed by spinning stainless steel.

The housing 21 and the ball bearing 13 are pressed into or otherwise suitably carried in fixed relationship by support body 25.

The body 18 is pressed onto the shaft 11. This press fit will provide sufficient fluid integrity for many applications. A fluid pressure chamber is indicated at 27. If it is needed in a given application, a static seal such as a metallic O-ring 28 may be interposed between the body 18 and the shaft 11. A gasket may also be provided to aid in the provision of a fluid seal between the housing 21 and the support body 25.

A spring 30 is carried by the spring retainer guide 24. The spring 30 coacts with the body 17 which is movable axially. The spring 30 is normally in compression. The bodies 17, 18 have smooth complemental surfaces 32, 33 which define a fluid film producing region. In this region, between the surfaces 32, 33, a film of fluid under pressure is developed to separate the surfaces. This sealing film substantially prevents the axial flow of fluid from the pressure chamber 27 past the body surfaces 32, 33. When the device is in operation and the fluid to be sealed is a gas, the dimension between the surfaces 32, 33 is from 0.000020 to 0.0005 inch.

To inhibit the axial leakage of fluid from the moment when the fluid under pressure is first introduced into the chamber 27, the spring 30 is under compression to hold the surfaces 32, 33 in touching contact. As a compensated pressure film is built up between the surfaces, the body 17 will shift axially to the left, in Figures 1, 3 and 4, and it will then be held in minutely spaced relationship so long as fluid under pressure is retained in the chamber 27.

The spring retainer 24 has a substantial radial dimension and a relatively short axial dimension. The retainer serves a dual function as both a housing and a guide for the spring 30. Through this construction the spring may be a relatively flat coil spring. The combined effect is to retain such a spring in substantially its desired configuration and at the same time permit the fluid seal to be extremely compact. The seal is also very light in weight.

Through this construction a seal is provided which is very desirable for such applications as aircraft use where extremes of temperature and speed are met.

In a device made in accordance with the present invention, one of the bodies is foraminous. In the present disclosure, the body 17 is the foraminous body. The body 17 includes restricting fluid passages which form compensating and adjustment means for the conduction of fluid to the region defined by the surfaces 32, 33. In the embodiment of Figure 1, the compensating means takes a form known as "orifice compensation." In this embodiment, a plurality of recesses 34 are formed in the surface 32. These recesses are generally very shallow to eliminate turbulent chatter in the case when the fluid to be sealed is a gas. In such cases the depth of a recess may be from 0.000050 inch to 0.009 inch. This recess depth is a function of the operating conditions and the fluid to be sealed and it may be, in some cases, as much as one-eighth inch or more.

The body 17 has a surface 35 which is exposed to the pressure chamber 27. This surface 35 is generally radial and may be referred to as a pressure chamber surface. A fluid passage 36 is formed to communicate with the pressure chamber surface 35 and each of the recesses 34. A restricting orifice 37 is formed in each of the passages 36. Generally three or more identical sets of recesses 34, orifices 37 and passages 36 are employed to maintain circumferential stability.

The orifice 37 causes a pressure drop when fluid passes through it. The pressure drop is dependent on the rate of fluid flow through the orifice. In operation, a film of fluid under pressure acts between the surfaces 32, 33. A slight amount of fluid will be constantly escaping at the inner edge, radially speaking, of the region defined by the surfaces 32, 33. The fluid flow at this inner edge is dependent on the distance between the surfaces 32, 33. Thus, if the pressure in the chamber 27 is high it will press against the chamber surface 35 and cause the body 17 to shift toward the body 18. This will decrease the distance between the surfaces 32, 33. As the surfaces 32, 33 move more closely together, the flow of fluid escaping radially from the fluid region will decrease. Since the flow of escaping fluid decreases, the flow of fluid through the passage 36 and the restricting orifice 37 decreases. As the flow of fluid through the orifice 37 decreases, the pressure drop decreases. The result is an immediate rise in pressure in the space between the surfaces 32, 33. This rise in pressure tends to check the movement of the body 17. It will thus be apparent that a self-balancing mechanism is provided. The pressure in the region between the surfaces 32, 33 may vary constantly but at any given time the net effect on the body 17 of the spring 30, the pressure in the fluid region and the pressure exerted against the pressure chamber surface 35 will balance.

It has been discovered that even with a dirty fluid long life for a seal of this type can be obtained if a filter 41 is provided. The filter 41 is interposed between the pressure chamber 27 and the passage 36. A cavity 42 may be provided between the filter 41 and the passage 36. The filter may define a portion of the pressure chamber surface 35.

It has further been discovered that the life of one of these cartridge filters may be materially increased by providing a pressure chamber surface 35 which extends radially inwardly from the filter 41. Thus a pocket 43 is formed radially inwardly from the filter 41. Dirt particles stopped by the filter 41 tend to drop into this pocket 43 and permit the filter 41 to have an exceptional life span.

A slinger 40 may be provided. In the embodiment of Figure 1 the slinger is an annular spacer 40 which is interposed between the body 18 and the shoulder 12. The slinger extends radially outwardly past the lip 22. Fluid under pressure thus must traverse a tortuous path over the slinger 40 thence inwardly and around the shoulder 22 and thence radially outwardly over the body 18. This tortuous path tends to cause dirt particles to drop out of the flowing fluid particularly when a centrifugal field exists due to rotation.

The body 17 has an inner radial surface 45 and an outer radial surface 46. It has been discovered that if the radial surface 45 is chamfered as at 42, unexpected and desirable results can be obtained. This chamfer reduces the radial dimension of the surface 32 between the recess 34 and the inner radial surface 45. The surface 32 in this region has an edge portion 48 which is substantially a circular line. This knife-like edge 48 may be defined as an "orifice-rim" as compared with a "land-rim" of the type shown between the recess 34 and the outer radial surface 46.

Certain unusual and unexpected characteristics have been obtained. In some applications, these characteristics provide improved results. It has been discovered that in the case of the so-called "land-rim" the rate of flow between the surfaces 32, 33 varies approximately as the cube of the distance between the surfaces. In the case of the so-called "orifice-rim," the flow varies approximately as the first power of the distance between the surfaces.

The flow between these surfaces has been found in the case of the land-rim to vary approximately as the difference between the squared pressures at its radial extremities. In the case of the orifice-rim 48 between the recess 34 and the space adjacent the radial surface 45, the flow is directly proportional to the pressure at its radial extremities. Further, in the case of the land-rim flow is a function of the viscosity of the fluid, while flow is not dependent on viscosity with the orifice-rim. Also, the orifice-rim has a choking effect when a gas is employed. The foregoing several factors allow different seal characteristics to be achieved by using certain combinations of orifice or land-rims depending on the application. The arrangement shown in Figure 1 with an "inlet land-rim" and an "outlet orifice-rim" is merely illustrative and is not thus limited as any combination may be employed.

A resilient impervious sleeve 49 is provided. In its preferred form the sleeve is interposed between the spring retainer 24 and the housing shoulder 20. The sleeve 49 is also fixed to the body 17. As the body 17 shifts axially back and forth, the resilient sleeve 49 retains fluid integrity in the cartridge 10. The sleeve 49 serves both as a gasket between the spring retainer 24 and the sleeve 21, and between the sleeve 21 and the body 17. The sleeve may also serve as the spring in those cases where the spring 30 is omitted.

The exact range of pressure over which the seal will operate in minute separation and the exact separating distance between the surfaces 32, 33 is a function of the areas of surfaces 32 and 35, of the total area of the recesses 34, and of the orifice dimensions 37 as well as the characteristics of dimensions of the inlet and outlet rims of surface 32. Generally, surface 33 is larger in area than surface 32. The function of the surface 32 is to form a smooth mating surface. Successful seals have been constructed and evaluated with proper "internal" and "external" balancing so that the surfaces 32, 33 never touch and yet are always separated by a distance of less than 0.00014 inch over a wide pressure range. It is therefore important that the surfaces 32, 33 be flat. Normally these surfaces are lapped to a flatness of one light band (about 0.000012 inch) or less. The surface finish is generally less than eight micro inches. It is also mentioned that the restriction orifice 37 may also be restricting capillary to produce preferred results in some applications.

Figure 3:
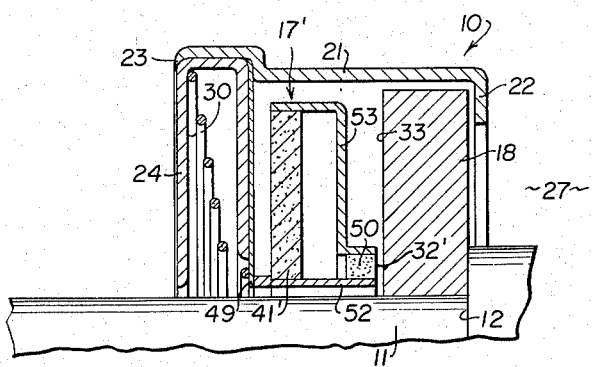
Figure 3 is similar to Figure 1 showing a slightly modified form of the invention of Figure 1.

In the embodiment of Figure 3, the compensating fluid conduction means takes the form of a permeable annular ring 50. This permeable body may be sintered metal. The preferred porosity of this permeable body has been described in some detail in the above referenced copending application for patent. Generally, the porosity is 15 percent or more and in some cases over 35 percent.

Inner and outer retainer rings 52, 53 may be provided to carry the sintered ring 50. An annular filter 41' is carried by these retainer rings 52, 53. Fluid under pressure passes from the pressure chamber 27 through the filter 41' and thence through the permeable ring 50 which forms the foraminous portion of the body 17'. The ring 50 forms a multitude of restricted fluid passages which function somewhat like the restrictions 37 where they are made in the form of capillaries.

Figure 4:
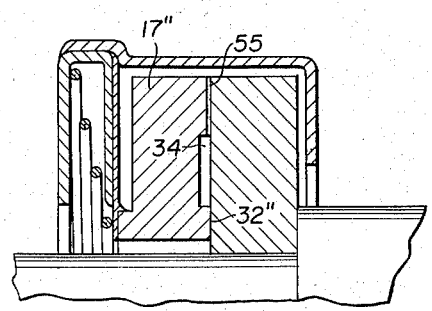
Figure 4 is a sectional view showing a cartridge unit having the film producing body surface made with the fluid compensating means in the form of a groove in the surface; and, Figure 5 is a fragmentary front elevational view of the recessed surface of Figure 4.
Figure 5:
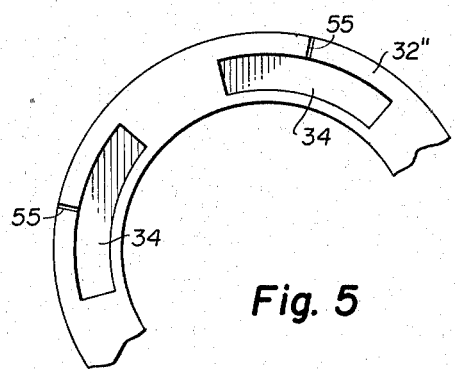

In the embodiments of Figures 3 and 4 the foramina of the body 17' and 17" respectively takes a new and novel form. A very small area groove 55 is formed in the surface 32". This groove 55, in the case of a gas seal, may have a cross sectional area from approximately 0.000025 to 0.0025 square inch. This groove type is not the same as larger grooves which do not have significant compensation in the way of pressure drop associated with flow.

As can best be seen by reference to Figure 4 and to the above referenced copending patent application of which this is a continuation-in-part, the recesses 34 may be curved but do not extend circumferencially about the entire surface 32. A plurality of these recesses are preferably formed. It has been found that good working results are obtained with three or more such identical recesses 34 if each recess is connected by an identical compensation means.

There has thus been described an improved fluid seal which has exceptionally long life even under dirty conditions through the use of a filter, a slinger, and pockets to collect dirt, and an improved seal having improved means for internal balance compensating.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A fluid seal for confining fluid under pressure to a chamber comprising, a housing, an annular foraminous body carried in the housing, the body having an annular sealing surface for fluid confrontation of a smooth complemental surface to define a sealing fluid film producing region therebetween, said body having an open surface, a filter for removing fluid contamination, said foraminous body including an impervious wall fixed to the filter and defining a filtered chamber between the filter and the open surface, and said region having one peripheral extremity open to the ambient atmosphere, said housing defining a pressure chamber for communication with a chamber to be sealed, the other peripheral extremity of said region and said open surface being open to said housing pressure chamber and in communication with one another through said housing pressure chamber and said filter, whereby to provide a device in which fluid under pressure may pass through said filter to remove contamination and then through said open surface, said body, and said sealing surface to said fluid film region to supply fluid to a generated sealing film of fluid under pressure.

2. A fluid seal for confining fluid under pressure to a chamber comprising, a housing an annular foraminous body carried in the housing, the body having an annular sealing surface for fluid confrontation of a smooth complemental surface to define a sealing fluid film producing region therebetween, said body having an open surface, a filter for removing fluid contamination, said foraminous body including an impervious wall fixed to the filter and defining a filtered chamber between the filter and the open surface, and said region having one peripheral extremity open to the ambient atmosphere, said housing defining a pressure chamber for communication with a chamber to be sealed, the other peripheral extremity of said region and said open surface being open to said housing pressure chamber and in communication with one another through said housing pressure chamber and said filter, and resilient means interacting with the body to urge it toward the fluid film producing region, whereby to provide a device in which fluid under pressure may pass through said filter to remove contamination and then through said open surface, said body, and said sealing surface to said fluid film region to supply fluid to a generated sealing film of fluid under pressure.

3. A fluid seal for confining fluid under pressure to a chamber comprising, a housing an annular foraminous body carried in the housing, the body having a porosity in excess of fifteen percent, the body having an annular sealing surface for fluid confrontation of a smooth complemental surface to define a sealing fluid film producing region therebetween, said body having an open surface, a filter for removing fluid contamination, said foraminous body including an impervious wall fixed to the filter and defining a filtered chamber between the filter and the open surface, and said region having one peripheral extremity open to the ambient atmosphere, said housing defining a pressure chamber for communication with a chamber to be sealed, the other peripheral extremity of said region and said open surface being open to said housing pressure chamber and in communication with one another through said housing pressure chamber and said filter, whereby to provide a device in which fluid under pressure may pass through said filter to remove contamination and then through said open surface, said body, and said sealing surface to said fluid film region to supply fluid to a generated sealing film of fluid under pressure.

4. A shaft fluid seal for confining fluid under pressure to a chamber having a shaft element passing through it, comprising, a housing for disposition about such shaft, an annular foraminous body carried by the housing, the body having a porosity in excess of fifteen percent, the body having a sealing surface for fluid confrontation of a smooth complemental surface to define a sealing fluid film producing region therebetween, the housing defining a pressure chamber, said body having an open surface in communication with the housing pressure chamber, a filter for removing fluid contamination, said body including an impervious housing wall fixed to the filter and defining a filtered chamber between the filter and the open surface, and an impervious flexible sleeve fixed to the housing and to the body, the sleeve defining a portion of said housing pressure chamber and being for maintaining fluid integrity between said body and said housing when the device is in use, and said region having a peripheral surface in communication with said housing pressure chamber, whereby to provide a device in which fluid under pressure may pass through said filter to remove contamination and then through said open surface, said body, and said sealing surface to said fluid film region to supply fluid to a generated sealing film of fluid under pressure.

5. A fluid shaft seal comprising, an annular permeable sintered body having a sealing surface for confrontation of a smooth complemental surface to define a sealing fluid film producing region therebetween, said body also having an open surface for communication with a fluid chamber to be sealed, the body having an impervious external surface, the open, impervious and sealing surfaces together defining the external contour of the body, and a filter fixed to the body, whereby to provide a device in which fluid under pressure may pass through filter to remove contamination and then through said open surface, said body, and said sealing surface to said fluid film region to supply fluid to a generated sealing film of fluid under pressure.

6. A fluid shaft seal comprising, a housing defining a pressure chamber, an annular body carried in the housing, the body having a sealing surface for confrontation of a smooth complemental surface, the sealing surface having a recess formed therein, said body having an open surface in communication with the housing pressure chamber, said sealing and open surfaces each having an aperture therein, said body also having a passage with a fluid pressure compensating orifice connecting said open surface and said recess apertures, a filter connected to said body and interposed between said open surface and such fluid chamber, said housing having a wall defining a filtered chamber between said filter and said open surface, and said sealing surface having one peripheral extremity defining a part of the housing chamber, whereby to provide a seal in which fluid will be passed from the pressure chamber through the filter and then through the orifice to the recess to form a film of fluid sealing pressure.

7. A shaft seal for confining fluid under pressure to a chamber having a shaft element passing through it, comprising, a housing defining a pressure chamber, an annular body carried in the housing and having first and second surfaces defining the radial extremities of the body, the body also having first and second side surfaces defining the longitudinal extremities of the body, the first side surface having a recess formed therein, said second surfaces each defining a part of said pressure chamber in at least one of the second surfaces, the body having a pressure compensating orifice connecting one of the second surfaces and the recess for the conduction of fluid under pressure from the fluid pressure chamber, the recess having one of its radial extremities defined by a curved side wall, the curved side wall being located close to one of the body axial surfaces such that the portion of said first side surface between said side wall and said one axial surface is substantially a line defining an arc of a circle, and an impervious flexible sleeve fixed to the body and the housing, the sleeve being for maintaining fluid integrity between said body and said housing when the device is in use.

8. A shaft seal comprising, a housing defining a pressure chamber, an annular body carried in the housing and having first and second surfaces defining the radial extremities of the body, the body also having first and second side surfaces defining the longitudinal extremities of the body, the first side surface having a recess formed therein, said second surfaces each defining a part of said pressure chamber in at least one of the second surfaces, the body having a pressure compensating orifice connecting one of the second surfaces and the recess for the conduction of fluid under pressure from the fluid pressure chamber, the recess having one of its radial extremities defined by a curved side wall, the curved side wall being located close to one of the body axial surfaces such that the portion of said first side surface between said side wall and said one axial surface is substantially a line defining an arc of a circle, and a filter fixed to the body and interposed between the pressure chamber and the pressure compensating orifice.

9. A fluid seal for a rotatable shaft comprising, an annular body having a smooth surface for confrontation of a complemental surface, said surface having a recess formed therein and a radially extending groove communicating with the recess, the groove being for the compensating conduction of fluid under pressure from a pressure chamber to be sealed to said recess to provide fluid under pressure for the formation of a pressurized sealing film of fluid.

10. A cartridge seal comprising, a housing defining a pressure chamber open at one end for communication with a chamber to be sealed, first and second bodies carried by the housing, the bodies being annular and having complemental surfaces defining a region for the formation of a film of fluid pressure therebetween, said bodies being relatively movable to vary the distance between said surfaces, said first body having a fluid compensating and distribution means formed therein for the conduction of fluid under pressure from the housing pressure chamber to said fluid region, one of said bodies including a surface in communication with the housing pressure chamber to cause said one body to shift toward the other body against the force of the film in the fluid region and reach a condition of external balance when the seal is in operation, and a flexible sleeve fixed to said housing and said one body to maintain fluid integrity between said housing and said one body.

11. A cartridge seal comprising, a housing defining a pressure chamber open at one end for communication with a chamber to be sealed first and second bodies carried by the housing, the bodies being annular and having complemental surfaces defining a region for the formation of a film of fluid pressure therebetween, said bodies being relatively movable to vary the distance between said surfaces, said first body having a fluid compensating and distribution means formed therein for the conduction of fluid under pressure from the housing pressure chamber to said fluid region, one of said bodies including a surface in communication with the housing pressure chamber to cause said one body to shift toward the other body against the force of the film in the fluid region and reach a condition of external balance when the seal is in operation, resilient means to urge the bodies toward one another, and a flexible sleeve fixed to said housing and said one body to maintain fluid integrity between said housing and said one body.

12. A cartridge seal comprising, a housing defining a pressure chamber open at one end for communication with a chamber to be sealed first and second bodies carried by the housing, the bodies being annular and having complemental surfaces defining a region for the formation of a film of fluid pressure therebetween, said bodies being relatively movable to vary the distance between said surfaces, said first body having a fluid compensating and distribution means formed therein for the conduction of fluid under pressure from the housing pressure chamber to said fluid region, one of said bodies including a surface in communication with the housing pressure chamber, a spring retainer guide carried by the cartridge, a spring carried substantially entirely within the spring retainer and projecting from the retainer to urge relative movement of the bodies, and a flexible sleeve fixed to said housing and said one body to maintain fluid integrity between said housing and said one body, whereby to provide a device in which the forces exerted on said one body by the spring, the fluid pressure in the chamber to be sealed, and the fluid film in the region will balance one another and in which said fluid compensating and adjustment means will conduct varying quantities of fluid under pressure to maintain said balance.

References Cited in the file of this patent

UNITED STATES PATENTS

| | | |
|---|---|---|
| 1,315,822 | Doran | Sept. 9, 1919 |
| 1,927,543 | Doyle | Sept. 19, 1933 |
| 2,075,444 | Koehring | Mar. 30, 1937 |
| 2,555,492 | Kidney | June 5, 1951 |